US006227093B1

(12) United States Patent
Rensky, Jr.

(10) Patent No.: US 6,227,093 B1
(45) Date of Patent: May 8, 2001

(54) PIZZA DOCKING DEVICE

(76) Inventor: Bernard J. Rensky, Jr., 524 Aurora Pl., Redding, CA (US) 96001

( * ) Notice: Subject to any disclaimer, the term of this patent is extended or adjusted under 35 U.S.C. 154(b) by 0 days.

(21) Appl. No.: 09/468,766

(22) Filed: Dec. 21, 1999

(51) Int. Cl.[7] .................................................. B26D 5/08
(52) U.S. Cl. .............................. 83/563; 83/592; 83/613; 83/660; 83/665; 83/866; 30/365; 30/293; 366/69
(58) Field of Search ...................... 83/660, 866, 867, 83/868, 665, 523, 563, 595, 591, 596, 613, 614, 592; 366/69; 30/365, 293

(56) References Cited

U.S. PATENT DOCUMENTS 1,026,436 * 5/1912 Gregg ................................. 30/365
5,533,269 * 7/1996 Pickens et al. ...................... 30/293

* cited by examiner

Primary Examiner—W. Donald Bray
(74) Attorney, Agent, or Firm—Gerald L. Robertson

(57) ABSTRACT

The preferred embodiment of the present invention comprises a pizza docking device having a pair of guides atop a pan and retaining a roller therein. Said roller has a plurality of pins thereon in spiral orientation. The device is dimensioned such that when an uncooked pizza crust is place on said pan, said roller may be traversed across said crust, docking it with perforations of a desired spacing and depth. A pair of shelves is provided in an elevated portion of said guides for placement of said roller up and away from said pan such that crusts may be placed and removed.

6 Claims, 5 Drawing Sheets

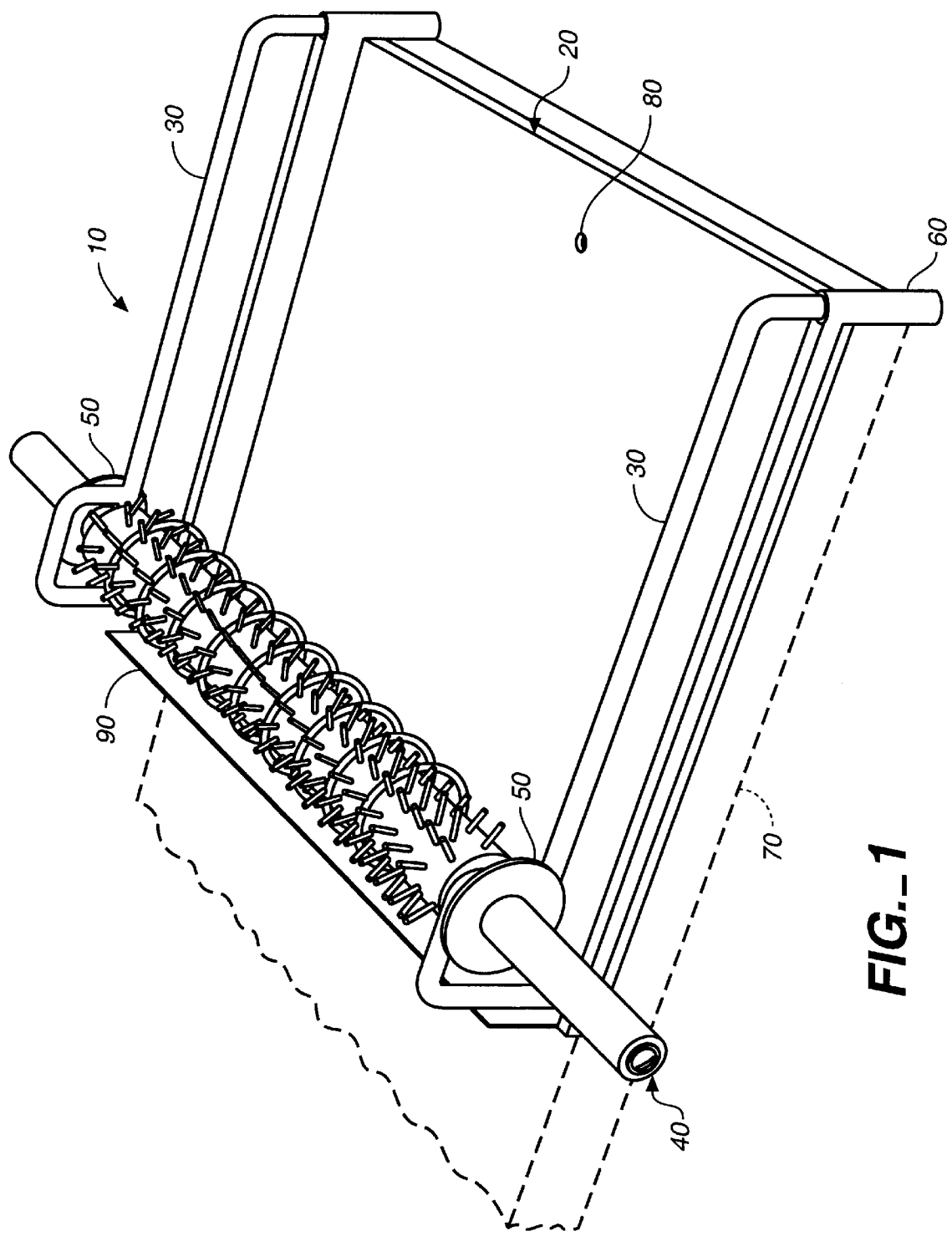
FIG._1

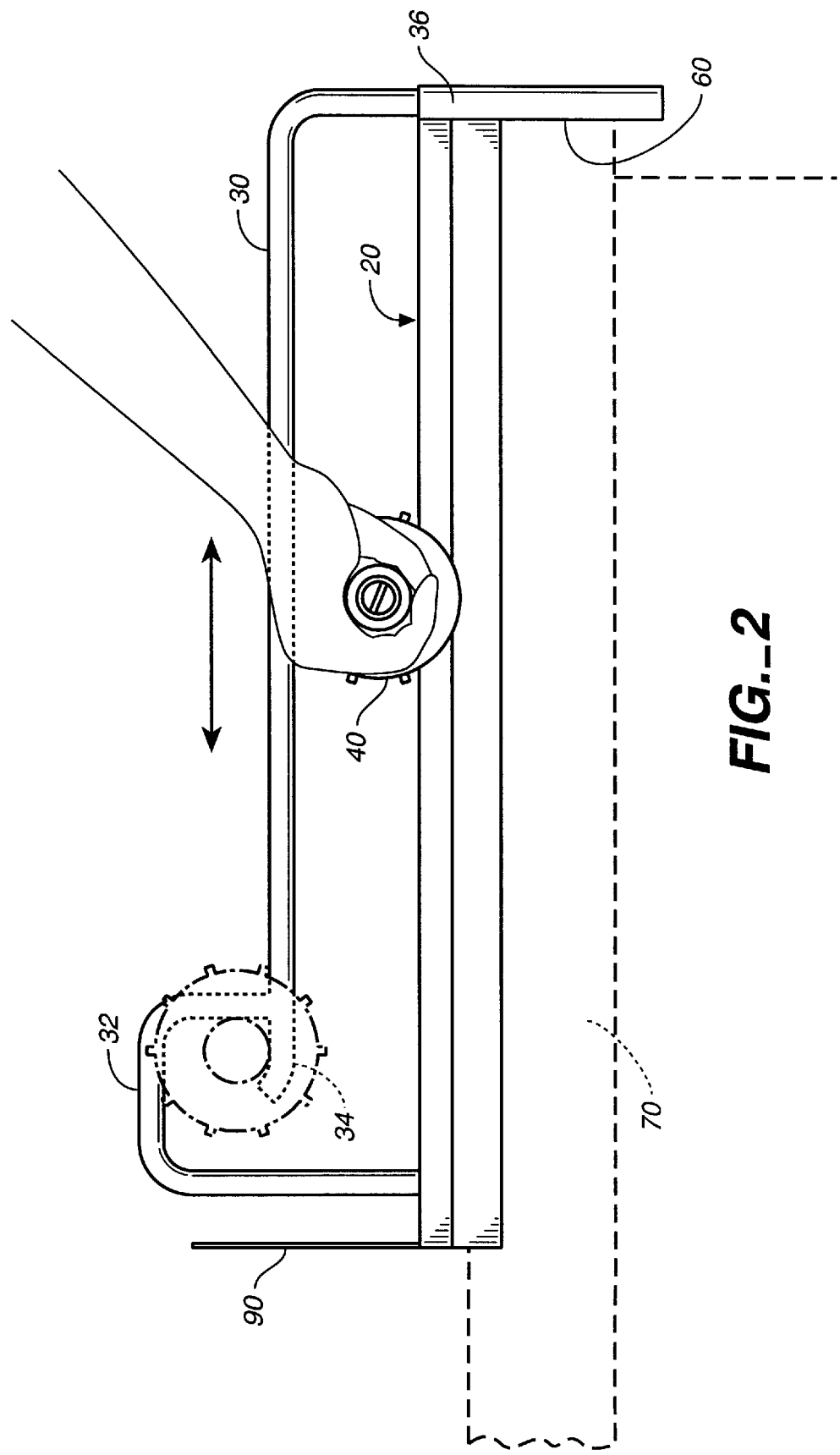
FIG._2

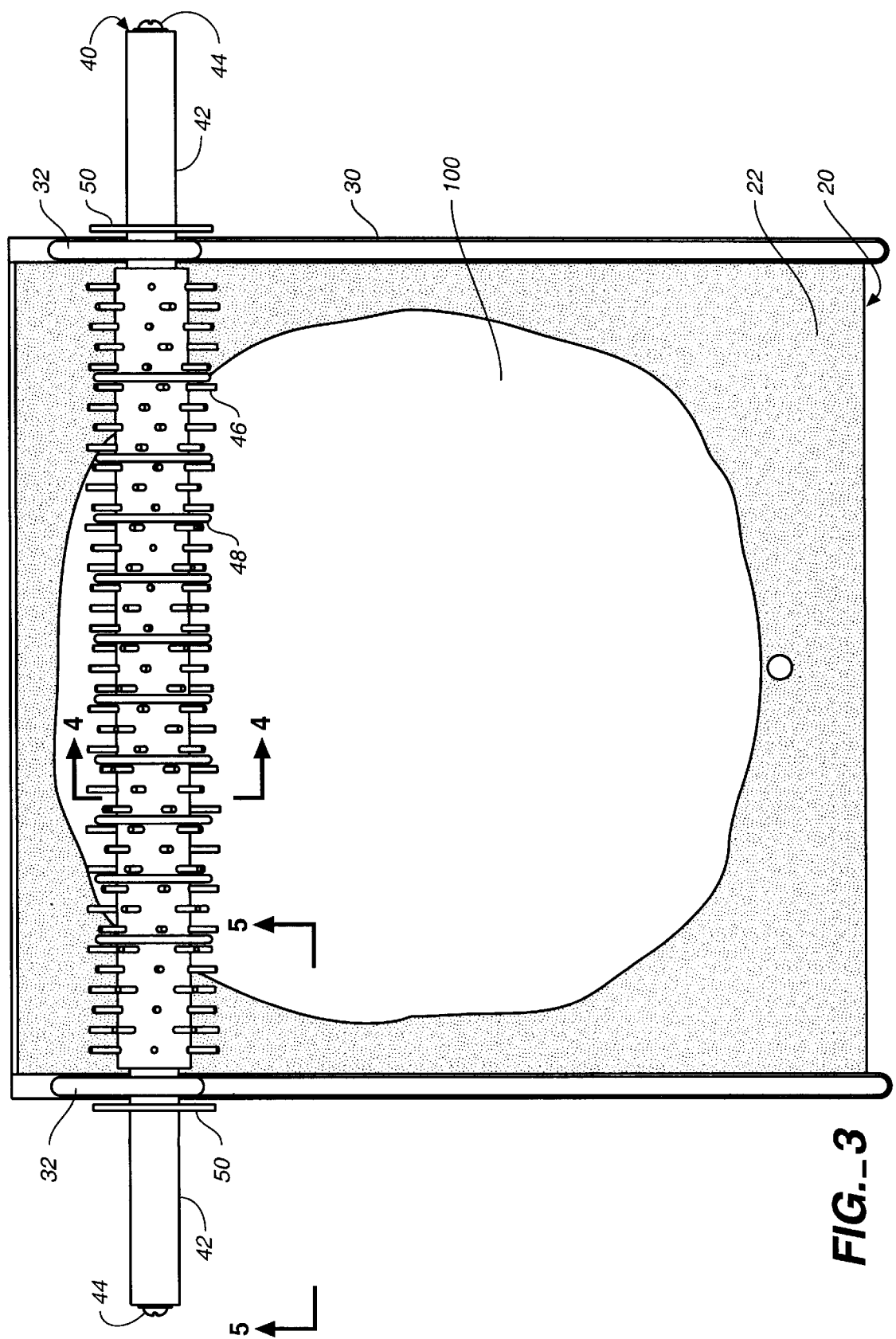
FIG._3

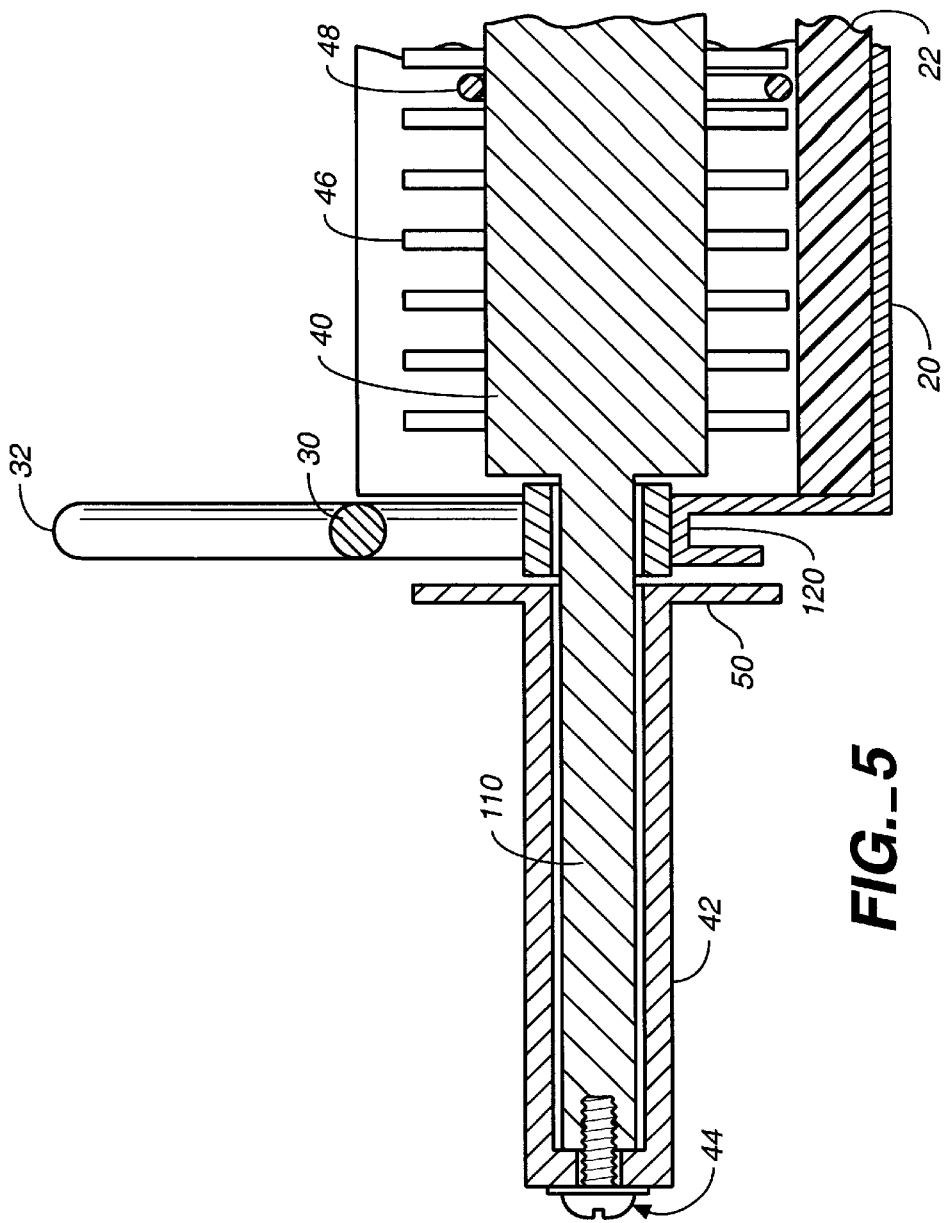
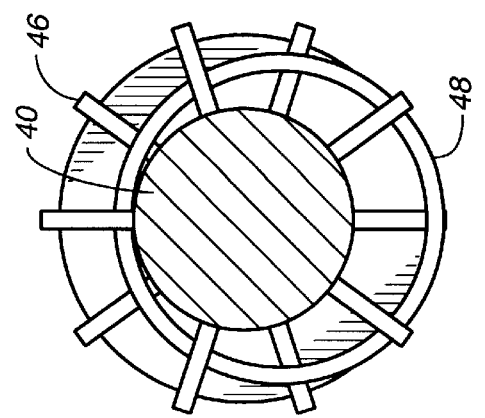
*FIG._5*
*FIG._4*

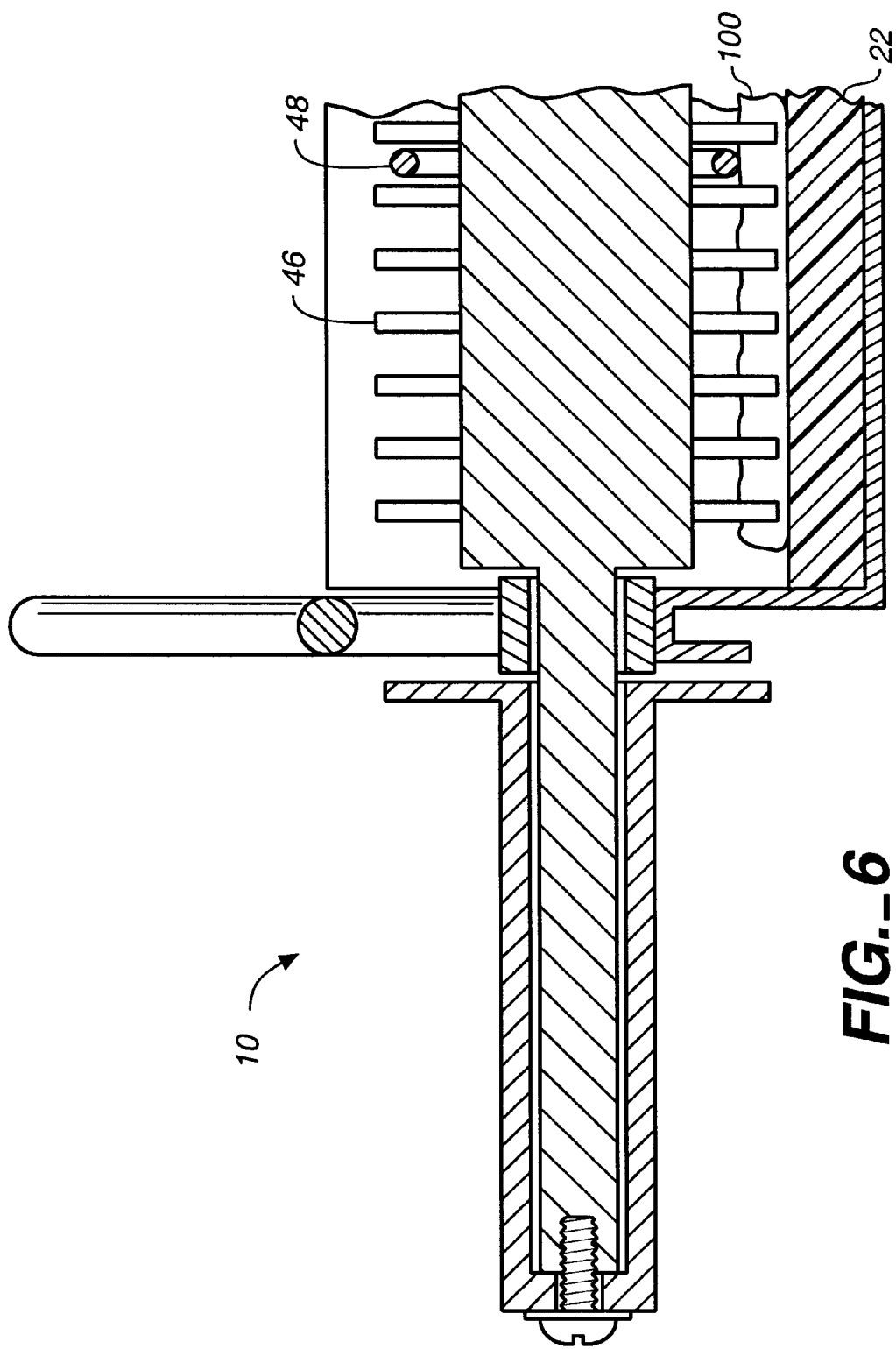
FIG._6

PIZZA DOCKING DEVICE

FIELD OF THE INVENTION

This invention relates to devices for food preparation, specifically a device for the "docking" or perforating of an uncooked pizza dough crust.

BACKGROUND OF THE INVENTION

Pizza is an extremely popular food since it is tasty, convenient, and relatively easy to prepare. The success of pizza restaurants has resulted in the proliferation of a variety of pizza franchises specializing in the rapid preparation, baking and serving or even delivering of low cost, high quality pizza pies.

As in any restaurant relying on selling a high volume of products, consistency is a key to achieving success. Significant in building a successful restaurant franchise is the concept of providing food products which meet an expectation of the public with regard to quality of ingredients, product packaging, price, and consistency of taste. Consumers have come to expect that when they order a specific food product from a franchise restaurant, that it will be essetially the same product in a Massachusetts retaurant or another franchise location in Arizona under the same name. In the pizza business, the same is true. Customers expect to receive the same product in various franchise locations, making the preparation, baking and presentation of the product extremely important for customer satisfaction arid therefore, success.

One of the factors which must be controlled to assure a quality pizza crust is in the perforation of the flattened uncooked dough, a process called "docking." Docking is defined in Wayne Gisslen's book *Professional Baking*, Second Ed., published in 1985 by John Wiley & Sons, as "piercing or perforating pastry dough before baking in order to allow steam to escape and to avoid blistering." Further, in *The New Professional Chef™*, Fifth Ed., 1991, published by Van Nostrand Reinhold, edited by Linda Glick Conway, at page 721, docking is described as "slashing the top of shaped dough before baking it to allow the top to expand an/or to create a decorative effect." In the same book, docking is described at page 845 as "to cut the top of dough before baking to allow it to expand."

Docking is necessary to ensure that undue blistering is all but eliminated in order to enhance flavor—eliminating burnt crust, and to allow ingredients placed on top of the pizza to cook evenly and without being displaced by bubbles, etc. Docking is generally accomplished by hand by either slashing the dough with a knife or by hand rolling an item like a short rolling pin over the dough which has been provided with a series of protrusions with which to pierce the dough. These devices must be of restaurant grade, and must be used properly to have the desired effect.

DISCUSSION OF THE PRIOR ART

U.S. Pat. No. 4,606,923 issued Aug. 19, 1986 to inventor Ricke sets forth a satisfactory discussion of the prior art up to that point relevant to the embossing of dough to produce fried pizza crusts. In the discussion, various patents are noted: Novissimo, U.S. Pat. No. 3,303,796, teaching forming three-dimensional shapes by roll-pressing; Stamping pizza sections as in U.S. Pat. No. 3,765,909, issued to Moline; scoring food products in a scoring "station" using a device comprising flexible plastic teeth, as in Wagner, U.S. Pat. No. 3,962,751; as well as Totino, U.S. Pat. No. 4,170, 659, which teaches docking a dough sheet using punched holes which upon frying form fairly hard zones, and others.

Hand dockers are generally fairly heavy, and if not careful, a user can drop such an appliance with either damage to the roller as a result, or even personal injury if accidently hit by the device. At a minimum, such an event necessitates washing the device, taking time and therefore reducing productivity.

Since the Ricke patent, other prior art references have evolved which are worthy of note. The Conkey Patent, U.S. Pat. No. 4,718,769 discloses a dough preparation apparatus having a shaft with a plurality of individual rollers mounted thereon. Sleeves are rotatably mounted upon the shaft end regions as handles, and the apparatus is guided by a a pair of guaging rollers just inside each handle. U.S. Pat. No. 4,574,090 issued to Paulucci Mar. 4, 1986 also teaches docking a pizza crust such that docking produces holes spaced one and one-quarter inches apart in both directions thoughout the width and breadth of a sheet, which is then cut into pieces of desired shape.

Other information related to the docking of dough in high-volume food processing operations can be found in U.S. Pat. No. 5,591,470, issued Jan. 7, 1997 to Bartley, and U.S. Pat. No. 5,417,989, issued May 23, 1995 to Atwood et al. These two later patents teach the use of automated machines for docking prepared foods such as pizza crusts or bialys.

The automated pizza docker disclosed in U.S. Pat. No. 4,573,388, includes a motor driven shaft with radially expanding spines for perforating the dough. These spines are offset on wheels to avoid forming a continuous line, reducing the tendency of the doughto lift after perforation. A comb assembly is provided to aid in separating the dough lifted by the spines. The Sullivan device, though effective, is fairly large in terms of its footprint, requiring a set amount of designated space, and presenting the need for spatial consideration in a retail or franchise setting. Further, it requires consumption of electricity, which increases costs of operation and introduces the further burden of maintenance requirements for safe and continuous operation.

What is needed then is a low-cost alternative docking device which can be used safely, with low maintenance, and potentially without a cost of operation such as consumption of electricity. Further, a reliable device which can be table or counter-mounted would be desirable in applications where only limited workspace is available.

SUMMARY OF THE PRESENT INVENTION

It is an object of the present invention to provide a pizza docking device which is useable in a franchise or fast food operation where limited counterspace is available.

It is a further object of the invention to be of manual operation, alleviating the need for power, motors, or the additional expense of maintenance associated therewith.

It is a further object of the present invention to provide a means of retaining the docking device such that it is not easily dropped.

It is a further object of the present invention to leave perforations in the dough at the desired spacing and desired depth to assure high quality tast and texture, while preventing sticking or lift.

The device may either be mounted on a counter, or because of its configuration, may be securing set on a flat surface with little danger of movement due to its inherent weight.

Briefly, the preferred embodiment includes a pan or shelf whereupon a generally round flattened uncooked pizza dough crust may be placed for the docking operation. On the sides of said pan are provided guides which retains a roller provided with a plurality of pins for docking the flattened dough. The roller is operated by hand via a rotatable handle on each end. Just inside the handle are mounted guide discs to maintain the roller in registration with the guides. The pins are oriented spirally along the roller to prevent tearing of the dough, and at predetermined spaces, a ring is interposed within said pins to aid in keeping the dough from lifting during the docking process. At one end of the pan, the guide is configured to accept the roller up and out of the way such that the docked pizza crust may be lifted off the pan for the next step of food preparation. At the opposite end of the preferred embodiment, the pan protrudes downward providing a stop against which the device may contact the counter where it is to be used. A dowell may also be provided in the pan to secure a cutting board or other suitable restaurant-grade insert, thereby facilitating removal for cleaning. The entire device may be comprised of stainless steel, plastic or a combination of each such that the desired weights of roller and pan are achieved.

BRIEF DESCRIPTION OF THE DRAWINGS

FIG. 1 is an isometric view of the preferred embodiment showing the roller positioned up and away from the pan area in that portion of the guides so configured;

FIG. 2 is a side view showing the relationship of the pan to the counter, including the stop; as well as the roller being operated, with the "up and away" position shown in phantom.

FIG. 3 is a plan view of the device showing the dimensional relationships of the guides and roller;

FIG. 4 is a cross-section of the roller in FIG. 3, at line 4—4.

FIG. 5 is a cross-section of the device in FIG. 3 at line 5—5.

FIG. 6 is a cross-section of the device in FIG. 3 at line 5—5 showing the device having an uncooked pizza crust placed therein.

DETAILED DESCRIPTION OF THE PREFERRED EMBODIMENT

The preferred embodiment of pizza docking device assembly 10 is shown in FIG. 1. Pan 20 is provided with a pair of guides 30 which direct the movement along pan 20 of the roller 40. A pair of guide discs 50 are positioned on roller 40 to maintain said roller within guides 30. A stop 60 protrudes downward from pan 20 to contact a pan or other surface 70 upon which the assembly 10 rests. A backsplash 90 is located at the end opposite stop 60 to prevent the spreading of food scraps, and to assist in keeping pan 20 clean.

FIG. 2 shows roller 40 being rolled atop pan 20, manually. The orientation of stop 60 against counter/surface 70 is seen, as well as the backsplash 90. The location of roller 40, shown in phantom in the "up and away" position shows the upper portion 32 of guide 30, and the upwardly bending termination 34, thereof This portion of guide 30 allows roller 40 to be raised and set onto guide 30 "up and away" from pan 20. Sleeves 36, are welded to the corners of pan 20, and receive guides 30 therein.

FIG. 3 shows roller 40 in its "up and away" position in guide 30, proximate to upper portion 32. The flattened, uncooked pizza crust 100, rests on pan 20. A pair of rotatable handles 42 are each retained by a retaining means 44, in this embodiment a screw. Further shown in FIG. 3 are the plurality of pins 46, and a plurality of loose rings 48. The spiraling orientation of pins 46 is shown both in FIG. 3 and FIG. 1. Pan 20 is shown with a textured insert 22, comprised of, for example, either a hard plastic, nylon or other material suitable for food preparation. Pan 20 itself, is typically of 303 stainless, fashioned to receive guides 30 in sleeves 36, proximate to each corner thereof.

FIG. 4 shows the orientation of loose rings 48 and pins 46. Rings 48 prevent the dough 100 (not shown) from lifting off pan 20 as docking is accomplished. FIG. 5 shows the configuration of roller 40, and handles 42. As seen in this figure, handle 42 has, integral to it, the guide disc 50, sized to allow roller 40 to be contained within guides 30. In the preferred embodiment, pan 20 comprises 16 guage stanless, with sleeves 36 welded thereto. Guides 30 are shaped as shown in the figures from ⅜" stainless steel rod. Guides 30 are retained in sleeves 36 via a stainless allen head set screw (not shown) engaging threaded bores in each.

In the preferred embodiment, roller 40 comprises food grade stainless steel, or alternately food grade PVC. Pins 46 include a threaded portion sized to engage corresponding threaded bores in roller 40. Typically, roll 40 is sized at approximately 1⅝" by 16½" and contains 10 spirals of 20 to 21 pins each. For a roller of approximately 2" by 16½", approximately 12 spirals of 20 to 21 pins are employed. Applicant has established the degree of spiral by having a row end in parallel with the third next row's beginning position; i.e., row 1 spirals downward axially along roller 40, the last pin thereof being substantially parallel with the first pin of row 3.

Pins 46 are typically ⅛" diameter stainless steel, with a 6–32×⅜" threaded portion which is engaged in comparable bores in roller 40. The outer points of pins 46 are "bullet" shaped. In the preferred embodiment, pins 46 are screwed into roller 40, using loctite for retention purposes. Various means may be used to install pins into the roller, and are already known in the relevant art.

As seen in FIG. 1, a plurality of rings 48 are interspersed at predetermined locations along roller 40. Said rings 48 comprise ³⁄₁₆'303 stainless steel, and are sized to have an inside diameter approximately equal to the diameter of roller 40 plus ⅝" (typically, the length of pins 46), sufficient to be retained in place and yet prevent a pizza crust from "climbing" roll 40 during the rolling process. In the preferred embodiment, rings 48 are sized thus to prevent the pizza crust from adhering to pins 46 as roller 40 traverses the pan. The displacement of rings 48 at the bottom of roller 40, create a similar desplacement near the top of roller 40 such that along the arc of roller 40, the pizza crust is pushed away from pins 46 by rings 48 (Compare the position of rings 48 in FIGS. 5 and 6). Rings 48 are located at the center of roller 40, and also at generally the third and sixth space left and right of center. Said locations can be varied according to the needs of the user.

As shown in FIG. 5, roller 40 is provided with an axle 110, of ¾" diameter whereupon a sleeve-type handle 42 is placed. A washer of approximately 1"×2½" is welded to handle 42, thereby forming guide disc 50. The weld portion of guide disc 50 is ground and polished. At the outer end of handle 42, a throughbore of apprixately ⅜" diameter is centered, and a ⅜"×1" washer, is welded in registry therewith. Axle 110 is drilled and tapped to accept retaining means 44, such that handle 42 may rotate freely upon axle 110.

Also shown in FIG. 5 is the configuration of pan 20. Pan 20 in the preferred embodiment is configured such that its sides form a U-shaped ledge 120. Ledge 120 runs the length of pan 20 and provides support for a slide 120 affixed thereto. Slide 120 terminates at the rear of guide 30, and emanates from a position proximate to sleeves 36 at the front of pan 20.

The vertical position of pins 46 relative to insert 22 determines the depth of the perforations introduced into the uncooked pizza crust. This height may be changed in a variety of manners, the most expedient being the use of an insert 22 of different size.

FIG. 6 shows the device having pizza crust 100 placed on insert 22. Loose rings 48 rest upon said crust 100, thereby preventing it from lifting as pins 46 perforate the crust.

While the invention has been described in connection with what is presently considered the most practical and preferred embodiment(s), it is to be understood that the invention is not limited to the disclosed embodiment(s) but, on the contrary is intended to cover various modifications and equivalent arrangements included within the scope of the appended claims.

What is claimed is:

1. A pizza docking device comprising:

a pan upon which an uncooked pizza crust may be placed;

at least one guide affixed to said pan, said guide spaced a predetermined distance from said pan;

a roller having a plurality of pins;

retaining means for keeping said roller in registry with said guide, such that when said roller traverses said pan, said pins perforate said pizza crust at a desired spacing and depth.

2. The pizza docking device of claim 1 wherein:

said pins having a spiral orientation along said roller.

3. The pizza docking device of claim 1 wherein:

a plurality of guides are affixed to said pan.

4. The pizza docking device of claim 1 wherein:

a removable insert is removably attached to said pan.

5. The pizza docking device of claim 1 wherein:

said device comprises restaurant grade stainless steel.

6. A pizza docking device comprising:

a pan having raised sides each forming a ledge, a rear backsplash and a downwardly protruding front edge, said pan sized to accept an uncooked pizza crust;

a roller having a plurality of pins predisposed thereon in spiral orientation;

a pair of axles affixed to said roller and centered thereon, the ends of said axle provided to accept a retaining means;

a pair of sleeved handles, one end of said handle having a throughbore therein, the other end of said handle being substantially open;

retaining means for rotatably affixing said handles to said axles;

a pair of circular guide discs having a centerbore, said guide discs affixed to said handles and oriented in a position normal to the axis of said handles, centered thereon;

a pair of guides substantially parallel with said ledges, said guides each having an elevated portion proximate to said backsplash, and a partial upwardly bending termination in conjunction therewith forming a pair of guide shelves; said guides affixed to said pan proximate to said front edge and said backsplash; said roller positioned on said ledges such that said guide discs retain said roller within said guides and allowing an operator to traverse said roller over a pizza crust thereby causing said pins to perforate said crust at a desired spacing, and further allowing said roller to be raised up and away from said crust and onto said shelves so that said crust may be easily removed from said pan.

* * * * *